(12) United States Patent
Milan

(10) Patent No.: US 6,843,684 B2
(45) Date of Patent: Jan. 18, 2005

(54) CONNECTING APPARATUS FOR DATA TRANSMISSION BETWEEN STACKABLE HUBS

(76) Inventor: Henry Milan, 1709 Apple Ridge Ct., Rochester Hills, MI (US) 48306

( * ) Notice: Subject to any disclaimer, the term of this patent is extended or adjusted under 35 U.S.C. 154(b) by 0 days.

(21) Appl. No.: 10/443,536

(22) Filed: May 22, 2003

(65) Prior Publication Data

US 2003/0199203 A1 Oct. 23, 2003

Related U.S. Application Data

(63) Continuation-in-part of application No. 09/730,030, filed on Dec. 5, 2000, now Pat. No. 6,607,408.
(60) Provisional application No. 60/382,642, filed on May 23, 2002.

(51) Int. Cl.$^7$ ............................................. H01R 31/00
(52) U.S. Cl. .................... 439/606; 439/752.5; 439/511
(58) Field of Search ................................ 439/606, 507, 439/511, 638, 639, 928, 110, 208, 752.5

(56) References Cited

U.S. PATENT DOCUMENTS

| | | | |
|---|---|---|---|
| 4,950,178 A | * 8/1990 | Harvey et al. | ............... 439/507 |
| 5,387,111 A | * 2/1995 | DeSantis et al. | ............ 439/511 |
| D425,860 S | 5/2000 | Goto | |
| 6,141,221 A | * 10/2000 | Tong et al. | .................. 361/724 |
| D448,736 S | 10/2001 | Milan | |
| D450,303 S | 11/2001 | Milan | |
| D451,480 S | 12/2001 | Milan | |

* cited by examiner

Primary Examiner—Renee Luebke
(74) Attorney, Agent, or Firm—MacMillan, Sobanski & Todd, LLC

(57) ABSTRACT

An electrical hub network connecting apparatus electrically couples a plurality of stackable hubs in close proximity to one another. The connecting apparatus includes a housing rigidly formed for enclosing a plurality of electrical conductors. The housing has a main body extending between transverse first and second ends each having a connector affixed thereto. The connectors are electrically connected by the electrical conductors and each releasably attaches electrically and mechanically to a respective receiving connector mounted on one of the hubs.

13 Claims, 5 Drawing Sheets

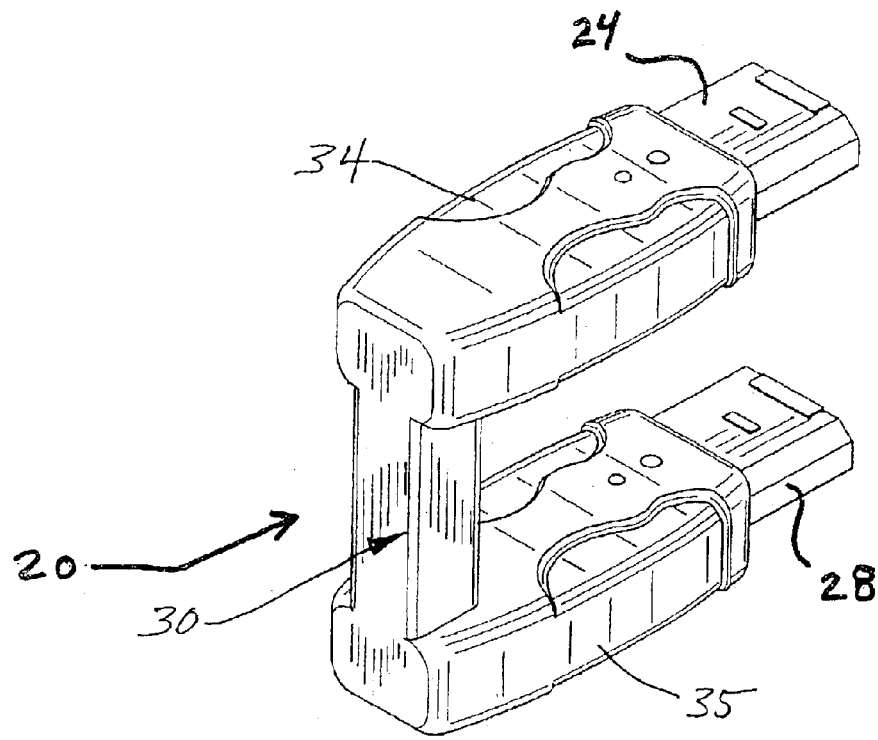
FIG. 8
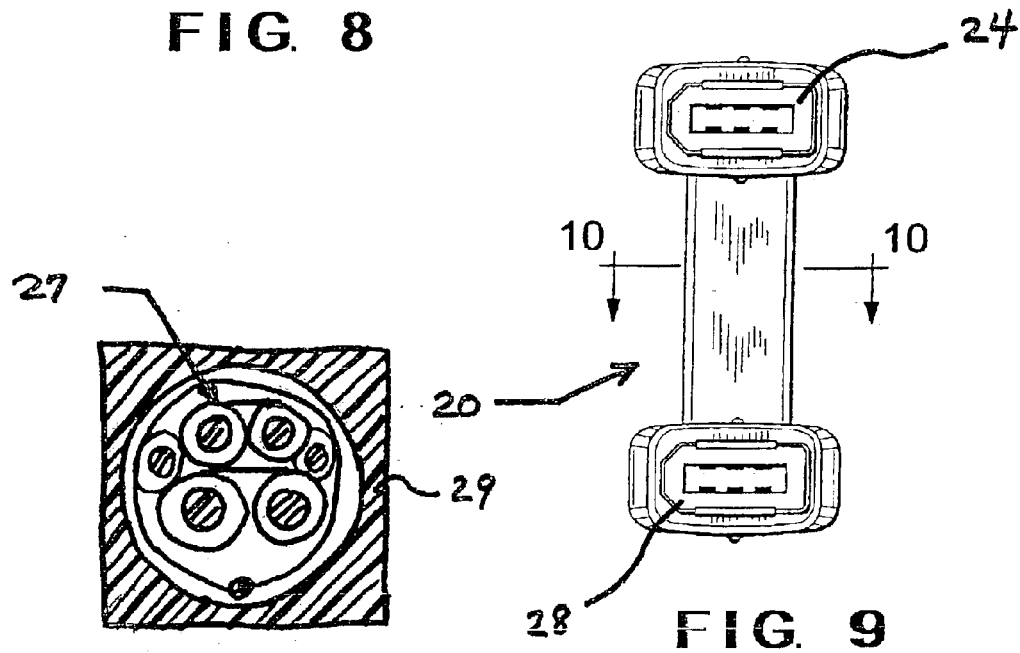
FIG. 9
FIG. 10

CONNECTING APPARATUS FOR DATA TRANSMISSION BETWEEN STACKABLE HUBS

CROSS-REFERENCE TO RELATED APPLICATION

This application is a continuation-in-part of the U.S. patent application Ser. No. 09/730,030 filed Dec. 5, 2000 now U.S. Pat. No. 6,607,408.

This application claims the benefit of U.S. provisional patent application Ser. No. 60/382,642 filed May 23, 2002.

BACKGROUND OF THE INVENTION

The present invention generally relates to electrical connectivity and, more particularly, electrical connectivity between electrical hubs. Most particularly, the present invention relates to electrical connectivity between stacked universal serial bus (USB) electrical hubs and stacked FireWire electrical hubs.

Electrical hubs for interconnecting portions of an electrical network are known. More recently, however, electrical hubs have been introduced for interconnecting portions of the electrical network where the electrical hubs are stacked upon one another. In some configurations, stacking of the electrical hubs provides simple and convenient mechanical and, possibly, electrical attachment. Often, stacked electrical hubs are not housed within an added enclosure.

Also, where no hardware is required to house the stackable electrical hubs, network cables are laced freely going to and coming from the stackable electrical hubs, where the network cables are easily attached to mating connectors provided on the stackable electrical hubs.

The electrical networks that employ electrical hubs typically are computer systems that interconnect computers, network hardware, and input/output computer devices. The data standards that are transmitted between the different portions of the electrical networks have varied widely, as has the different types of equipment that were serviced by the electrical networks. Currently, however, two very common types of electrical network data standards have emerged. These electrical network standards are the universal serial bus (USB) standard and the FireWire standard. FireWire is a registered trademark of Apple Computer Corporation of Cupertino, Calif.

The USB standard was conceived in 1993 by a consortium of computer industry companies, whose goal was to create a common means for communicating between the personal computer (PC) and its supported electronic devices. The consortium also wanted the USB standard to perform in a plug-and-play manner, which would minimize hardware and software setup. Further, the data throughput of the USB standard was expected to he compatible with that of the bandwidth of the supported electronic devices.

As the bandwidth of the supported electronic devices increased so did the need for the throughput of the USB standard. Faster versions of the USB standard were implemented and even faster versions are currently being developed. Presently, the USB is available on all PC's and many electronic devices have USB capability.

In about the same time frame that the development of the USB standard was occurring, the development of the FireWire standard, which is also known as the IEEE 1394 standard, was also taking place. The FireWire standard, however, was associated with Apple computers. In general, the FireWire standard process is a higher throughput and the supported electronic devices, typically, had greater bandwidth than their USB counterparts.

As in the case of the USB standard, the bandwidth of the FireWire supported electronic devices increased, and consequently, so did the need for the throughput of the FireWire standard. As a result, faster versions of the FireWire standard were implemented and even faster versions are presently being developed. Currently the FireWire standard is available on all Apple computers and some PCs, while many electronic devices have adopted FireWire capability.

Part of the development of both the USB and FireWire standards has involved the cables and their associated connectors that interconnect the varying computers and supported electronic devices. The standard cables and connectors that have resulted from the development of the USB and the FireWire standards provide easy connectivity to, from, and between the computers, hubs, and supported electronic devices.

Regardless of the data standard, be it USB, FireWire, or other standards that are employed by stacked electrical hubs, the current cables that interconnect stacked electrical hubs are, typically long. Since stacked electrical hubs provide no outer housing to visually and/or physically contain the maze of interconnecting stacked electrical hub cables, the area around the stacked electrical hubs can be cluttered.

In addition, a connector on a current interconnecting cable, which loops from one stacked electrical hub no another, for example, in a daisy chain manner, can get pulled away from its mating connector on the stacked electrical hub by a variety of means. Also, the interconnecting cable connectors and their mating electrical hub connectors can become damaged and/or the continuity of their connection can be disrupted, which could result in a malfunction of the computer system. Further, because of the length of the current interconnecting hub cables, the amount of material and associated costs need to be considered.

In conjunction with being long, current interconnecting cables that are employed between stacked electrical hubs are typically made of pliable plastic, which makes them susceptible to being cut, pinched, or damaged. As a result, the continuity within the current interconnecting cables can be disrupted, which too could result in a computer system malfunction.

Thus those skilled in the art continued to seek a solution to the problem of how to provide a better interconnecting cable between stacked electrical hubs.

SUMMARY OF THE INVENTION

The present invention concerns a connecting apparatus and a method for interconnecting stacked electrical hubs.

In one aspect of the invention, an electrical hub network connecting apparatus electrically couples a plurality of stackable hubs in close proximity to one another. The connecting apparatus includes a housing rigidly formed for enclosing a plurality of electrical conductors. The housing includes a main body, a first end, and a second end, wherein the first and second ends have a respective connector affixed thereto. Each connector is electrically connected to one another by the electrical conductor and is capable of releasably attaching electrically and mechanically to a respective receiving connector mounted on an associated one of the hubs.

The method according to the present invention for interconnecting electrical hubs each having at least one receiving connector comprises the steps of: a) providing at least two electrical hubs each having a receiving connector and positioning the receiving connectors in a predetermined relative orientation; b) providing a rigidly formed housing enclosing a plurality of electrical conductors, the housing including a main body connected between a first end and a second end, first and second connectors being attached to the first and second ends respectively, the first and second connectors being electrically connected to opposite ends of the plurality of electrical conductors; c) aligning each of the first and second connectors with a respective one of the receiving connectors; and d) electrically and mechanically releasably engaging the first and second connectors with the respective receiving connectors to electrically connect the at least two electrical hubs.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 8 is a rear perspective view of the dual FireWire connecting apparatus shown in FIG. 6;

FIG. 9 is a front elevation view of the dual FireWire connecting apparatus of FIG. 6;

FIG. 10 is a cross-sectional view of the dual FireWire connecting apparatus taken along line 10—10 in FIG. 9.

DESCRIPTION OF THE PREFERRED EMBODIMENT

Figure 1:
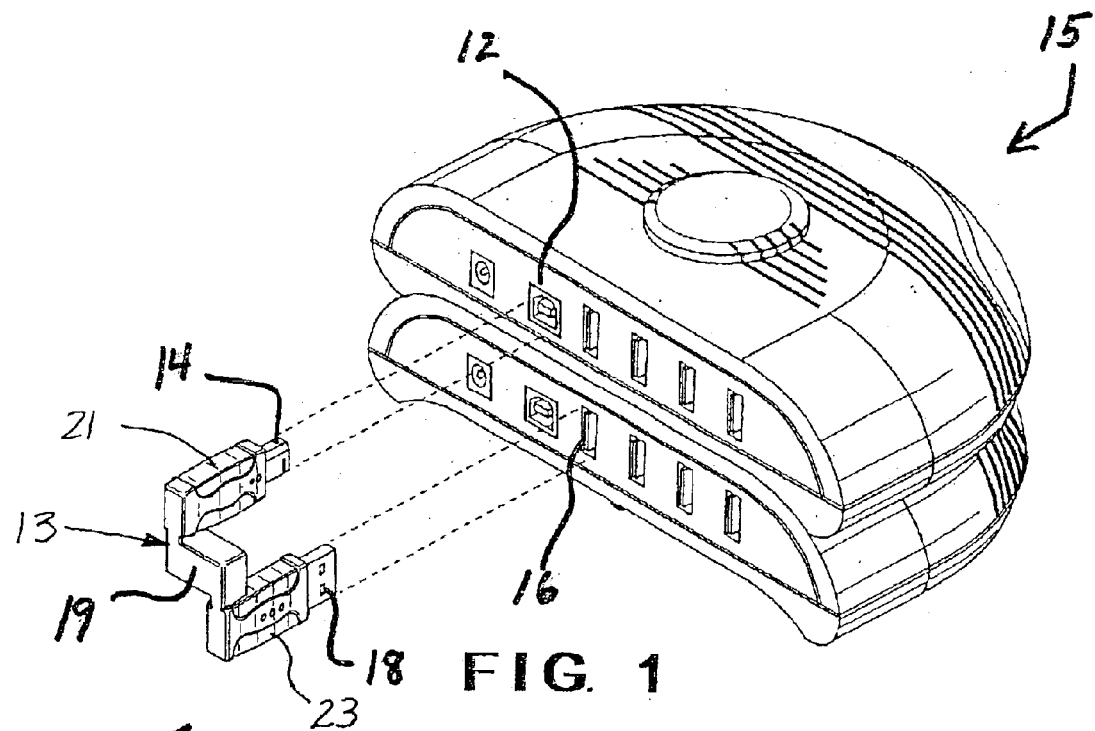
FIG. 1 is a rear perspective view of two stacked electrical hubs with a dual USB connecting apparatus being aligned with corresponding receiving connectors on the electrical hubs in accordance with the present invention.
Figure 2:
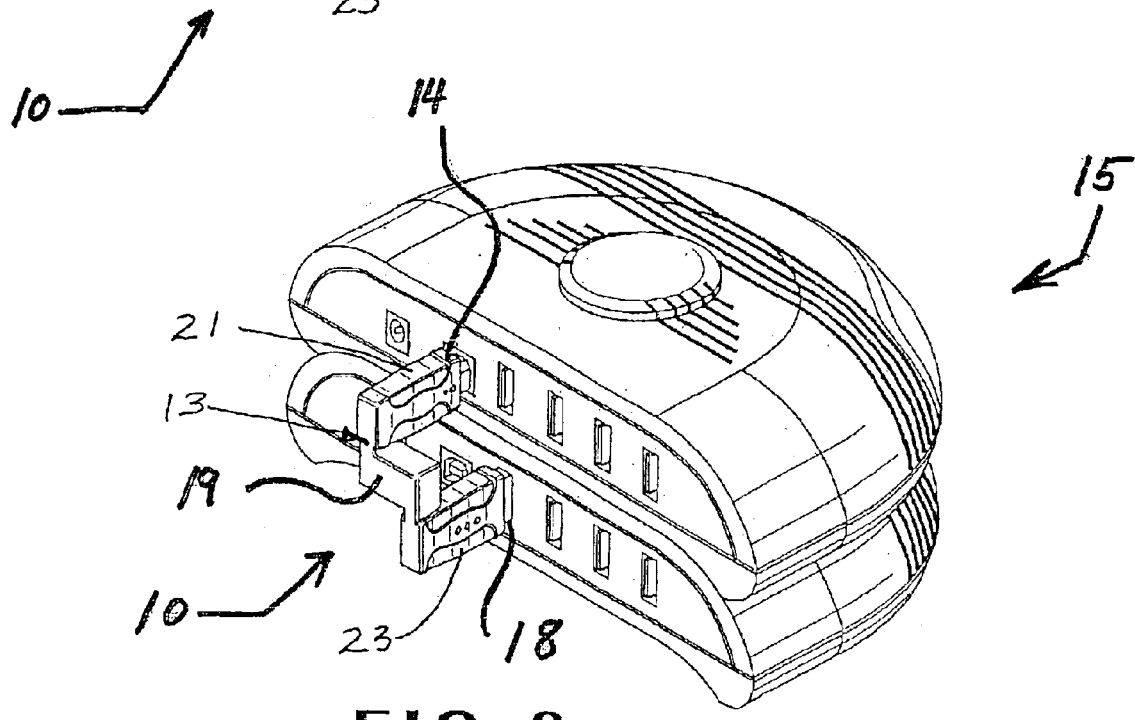
FIG. 2 is a view similar to FIG. 1 wherein the dual USB connecting apparatus is engaged with the corresponding receptacles on the electrical hubs.

In general, the present invention involves the interconnection of stacked electrical hubs. Although an example of vertically stacked hubs is used the following description, the term "stacked" used herein includes horizontal and diagonal adjacent positioning of two or more hubs. FIG. 1 illustrates a preferred embodiment of the present invention, wherein a dual connecting apparatus 10 is shown aligned for connectivity to a stacked pair of USB electrical hubs 15. The dual connecting apparatus 10 comprises a rigid housing 19 for encasing one or more electrical conductors such as USB wiring. The rigid housing 19 includes a main body 13, a first end 21, and a second end 23 wherein the main body 13 bridges the first end 21 and the second end 23. Further, the first end 21 and the second end 23 extend transverse to a longitudinal axis of the main body 13. A USB type B male connector 14 and a USB type A male connector 18 are affixed to the ends 21 and 23 respectively of the rigid housing 19. Also shown in FIG. 1 are a corresponding mating USB type B receiving connector 12 and a USB type A receiving connector 16 that are mounted on an upper one and a lower one of the USB stacked electrical hubs 15 respectively. The dual connecting apparatus 10 forms a Z-shaped portion between the receiving connectors. Consequently, as shown in FIG. 2, the USB connectors 14 and 18 and the USB receiving connectors 12 and 16 are in electrical and mechanical releasable attachment and are vertically and horizontally offset from one another.

Figure 3:
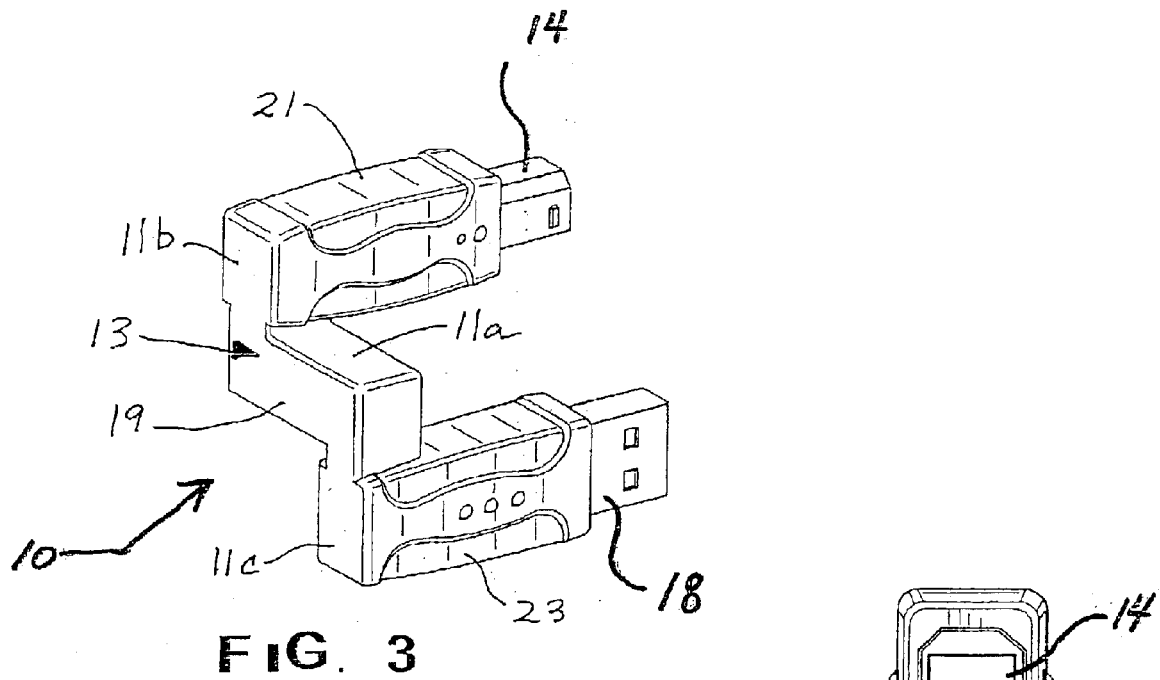
FIG. 3 is a rear perspective view of the dual USB connecting apparatus of FIG. 1.
Figure 4:
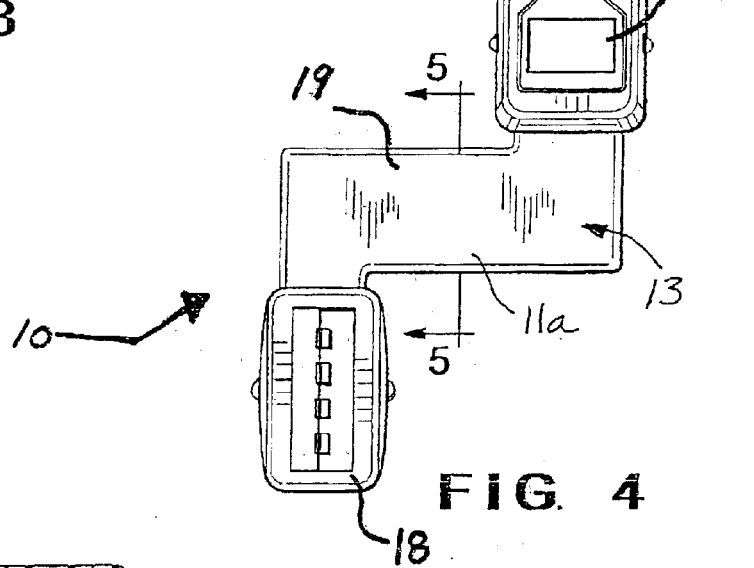
FIG. 4 is a front elevation view of the dual USB connecting apparatus of FIG. 1.
Figures 11A, 11B, 11C:
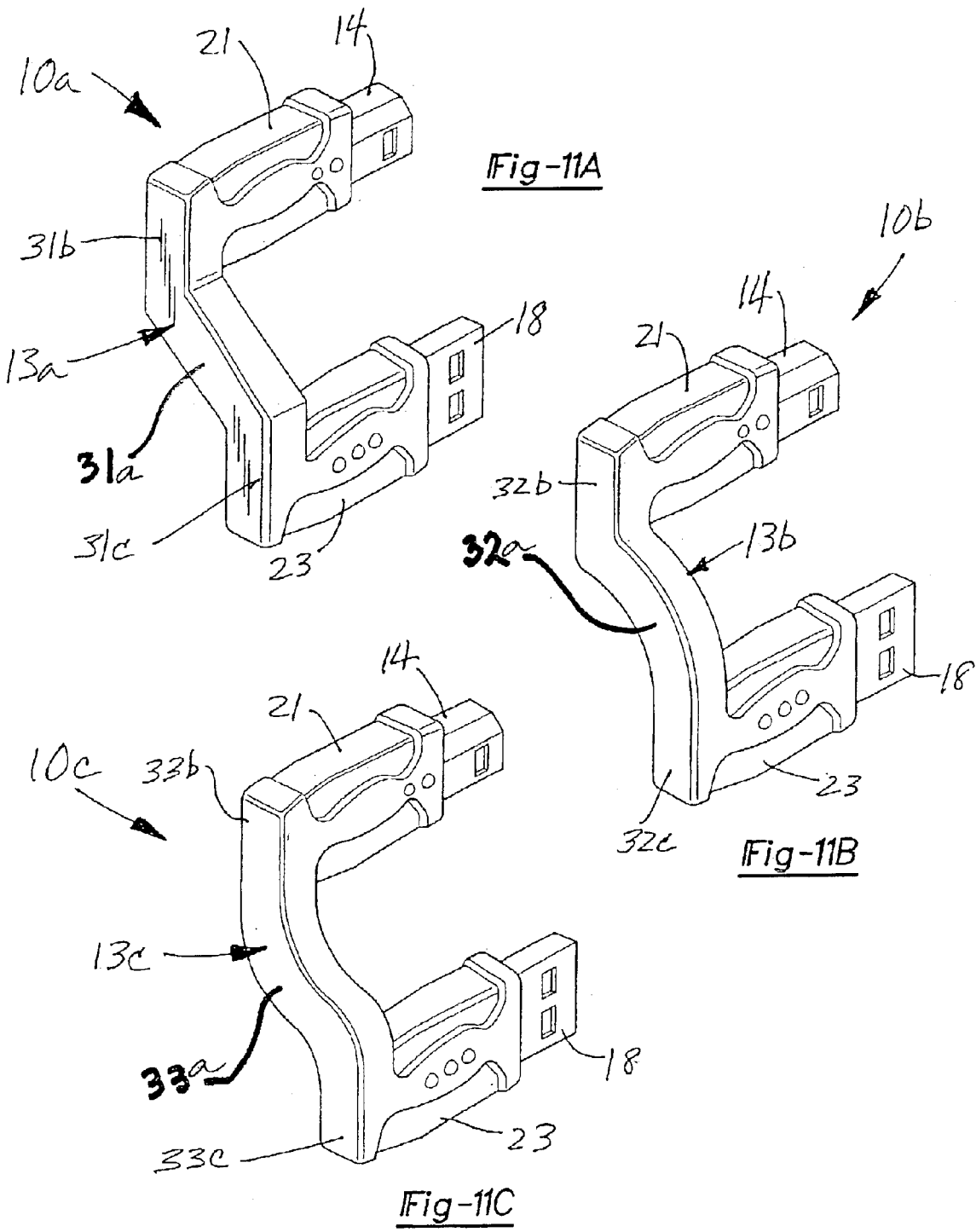
FIGS. 11A through 11C are each a rear perspective view of different modifications of the USB connecting apparatus shown in FIG. 3.

FIG. 3 illustrates an enlarged perspective view of the dual connecting apparatus 10, while FIG. 4 provides an enlarged front elevation view of the dual connecting apparatus 10. The main body 13 has a generally horizontally extending central portion 11a attached to the first end 21 by a generally vertically extending upper leg 11b and attached to the second end 23 by a generally vertically extending lower leg 11c. Thus, the "Z-shaped" main body 13 displaces the connectors 14 and 18 both vertically and horizontally. It can be appreciated that the dual connecting apparatus 10 may be formed into shapes other than the Z-shape as illustrated in FIG. 3. As shown in FIG. 11A, a first modification dual connecting apparatus 10a has a main body 13a comprising a diagonal central portion 31a bridging between a vertically extending upper leg 31b attached to the first end 21 and a vertically extending lower leg 31c attached to the second end 23. FIG. 11B illustrates a second modification dual connecting apparatus 10b that has a main body 13b comprising an arc shaped central portion 32a bridging between a vertically extending upper leg 32b attached to the first end 21 and a vertically extending lower leg 32c attached to the second end 23. FIG. 11C illustrates a third modification dual connecting apparatus 10c that has a main body 13c comprising an serpentine shaped central portion 33a bridging between a vertically extending upper leg 33b attached to the first end 21 and a vertically extending lower leg 33c attached to the second end 23. As a practical matter, the designer of electronic products will find many pleasing shapes in which the connecting apparatus may be made, all of which are within the scope of the present invention. Such shapes include a linear bridge or a lateral offset bridge using horizontal, vertical, curved, or serpentine portions either individually or in combination as part of the main body. Any shape of the rigid housing can be used as long as the connectors 14 and 18 are held in the proper orientation for the particular application.

FIG. 4 illustrates orienting the connectors so that the USB type B male connector 14 and the USB type A male connector 18 are at right angles relative to one another.

Figure 5:
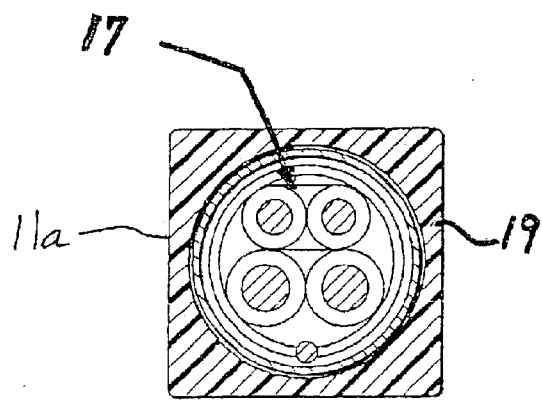
FIG. 5 is a cross-sectional view of the dual USB connecting apparatus of FIG. 1, taken along the section line 5—5 of FIG. 4.

FIG. 5 shows a cross-sectional view of the dual connecting apparatus 10, taken along the section line 5—5 of FIG. 4, where the rigid housing 19 encases an electrical wiring such as USB conductors 17, wherein the USB wiring conductors 17 are in electrical connection with the USB connectors 14 and 18. Any practical combination of the USB connectors and receiving connectors can be used in connection with the present invention.

Figure 6:
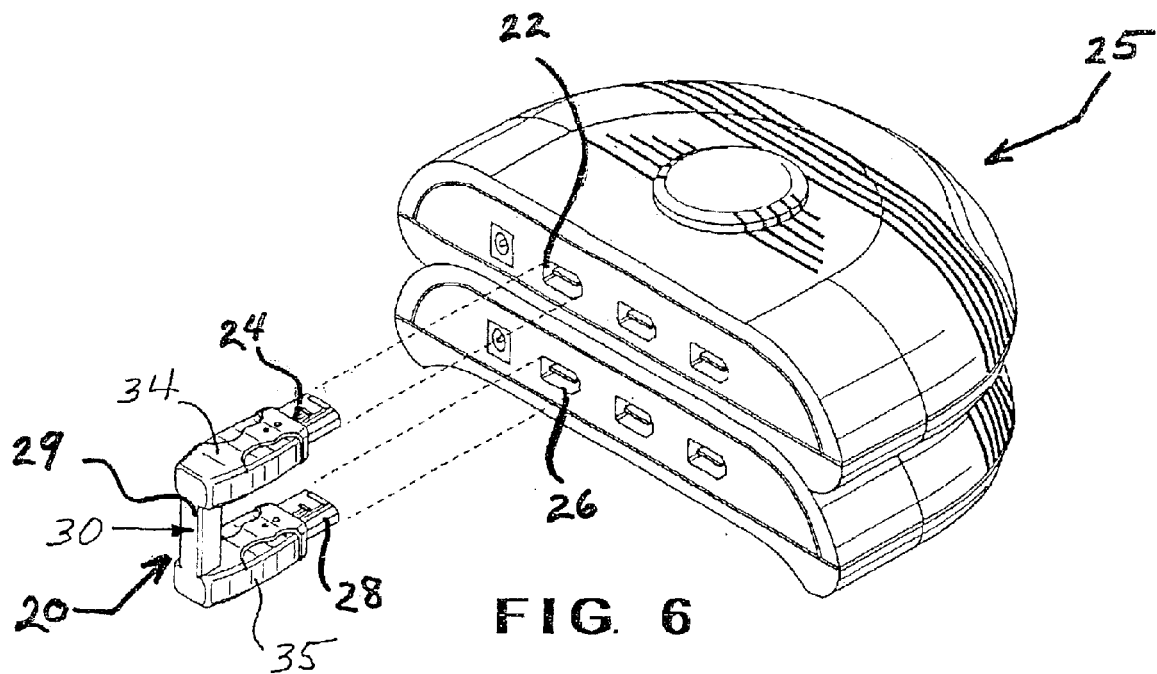
FIG. 6 is a rear perspective view of two stacked electrical hubs with a dual FireWire connecting apparatus being aligned with corresponding receiving connectors on the electrical hubs in accordance with the present invention.
Figure 7:
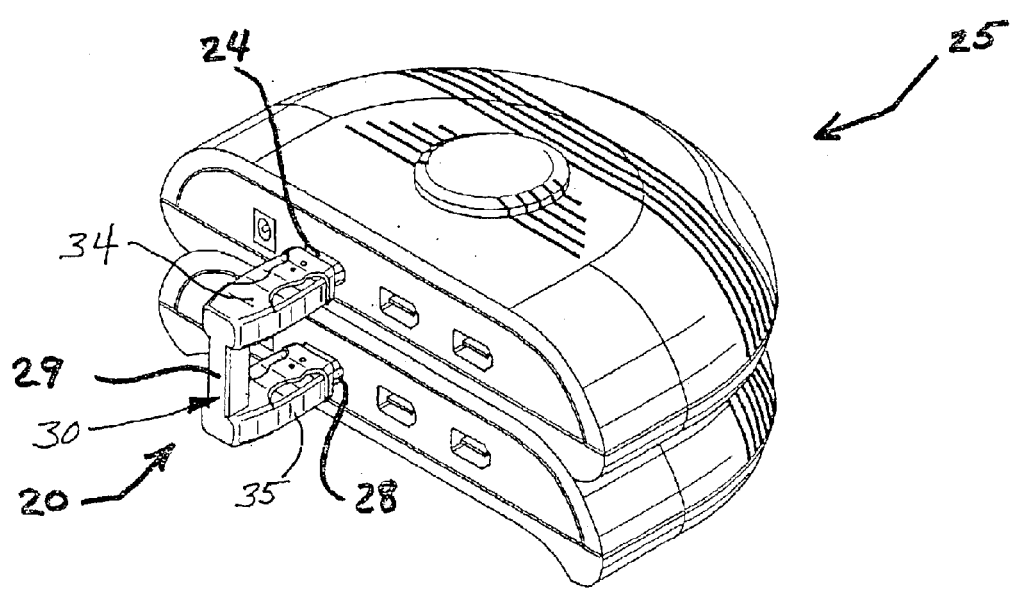
FIG. 7 is a view similar to FIG. 6 wherein the dual FireWire connecting apparatus is engaged with the corresponding receiving connectors on the electrical hubs.

FIG. 6 illustrates a second preferred embodiment of the present invention, where a dual inline FireWire connecting apparatus 20 is shown aligned for connectivity to a pair of stacked FireWire electrical hubs 25. Similar to the dual connecting apparatus 10 shown in FIG. 1, the inline FireWire connecting apparatus 20 comprises a rigidly formed FireWire housing 29 encasing a plurality of conductors such as FireWire wiring 27 (FIG. 10). The FireWire connecting apparatus 20 includes a FireWire main body 30, a FireWire first end 34, and a FireWire second end 35 wherein the FireWire main body 30 bridges the FireWire first end 34 and the FireWire second end 35. A six wire FireWire connector 24 and a six wire FireWire connector 28 are affixed to the respective FireWire first end 34 and the FireWire second end 35. Also shown in FIG. 6 are a corresponding mating FireWire receiving connector 22 and a FireWire receiving connector 26, which receiving connectors are mounted on an upper one and a lower one respectively of the FireWire stacked electrical hubs 25. Consequently, as shown in FIG. 7, the FireWire connectors 24 and 28 and the FireWire receiving connectors 22 and 26 are in electrical and mechanical releasable attachment. Other FireWire connectors and receiving connectors also can be used.

FIG. 8 illustrates an enlarged rear perspective view of the dual inline FireWire connecting apparatus 20. FIG. 9 illustrates an enlarged front elevation view of the dual inline FireWire connecting apparatus 20. The FireWire connectors 24 and 28 are oriented the same, relative to one another, in a vertically inline rigid construction of the dual inline FireWire connecting apparatus 20. Alternatively, the FireWire main body 30 may include inline horizontal or diagonal linear bridges. In addition, lateral offset bridges using vertical, horizontal, diagonal, curved or serpentine portions may be used either individually or in combination when forming the FireWire main body 30.

FIG. 10 shows a cross-sectional view of the dual FireWire connected apparatus 20, taken along section line 10—10 of FIG. 9, where the rigid FireWire housing 29 encases the FireWire wiring 27 and the FireWire wiring 27 is in electrical connection with the FireWire connectors 24 and 28.

In the present invention, by way of additional stacked electrical hubs 15 and 25, it may be appreciated that a plurality of the connecting devices 10 (10a, 10b, 10c) and 20 may be employed in the daisy chain manner. It may also be appreciated that the respective connecting devices 10 (10a, 10b, 10c) and 20 may utilize various shapes for bridging the respective connectors 14, 18, 24 and 28. Furthermore, the present invention may be exercised with varying orientations of the respective connectors 14, 18, 24 and 28 to one another, with varying alignments of the respective connectors within the respective apparatus 10 (10a, 10b, 10c) and 20. In addition, the connecting devices according to the present invention may be practiced on interconnected electrical hubs that are neither mechanically connected, adjacent, nor necessarily stacked.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An electrical hub network connecting apparatus for data transmission between a pair of adjacent electrical hubs comprising:

a rigid housing formed for enclosing a plurality of data transmission electrical conductors, said housing including a main body, a first end and a second end, said first and second ends being spaced apart along a first axis and along a second axis transverse to said first axis, said first and second ends extending in a direction transverse to said first and second axes;

at least a first connector and a second connector, said first and second connectors being attached to said first and second ends respectively;

at least one data transmission electrical conductor extending through said housing and being electrically connected at opposite ends to said first and second connectors, wherein when said first and second connectors are electrically and mechanically releasably attached to respective receiving connectors mounted on a pair of adjacent electrical hubs, said at least one electrical conductor provides a data transmission electrical connection between the hubs.

2. The connecting apparatus according to claim 1 wherein said first axis is substantially vertical and said second axis is substantially horizontal.

3. The connecting apparatus according to claim 1 wherein said main body has an upper leg extending in a first direction parallel to said first axis and attached to said first end, a lower leg extending in a second direction parallel to said first axis and attached to said second end, and a central portion connected between said upper leg and said lower leg.

4. The connecting apparatus according to claim 3 wherein said central portion extends a generally straight line parallel to said second axis.

5. The connecting apparatus according to claim 3 wherein said central portion extends along a generally straight line at angles to said first and second axes.

6. The connecting apparatus according to claim 3 wherein said central portion extends along a generally curved line.

7. The connecting apparatus according to claim 1 wherein said first and second connectors are USB male connectors.

8. An electrical hub network comprising:

a pair of electrical hubs each having at least one receiving connector, said hubs being stacked such that said at least one receiving connectors are offset in a vertical direction and in a horizontal direction;

a rigid housing formed for enclosing a plurality of data transmission electrical conductors, said housing including a main body, a first end, and a second end;

at least a first connector and a second connector, said first and second connectors being attached to said first and second ends respectively; and a plurality of data transmission electrical conductors extending through said housing and being electrically connected at opposite ends to said first and second connectors, said first and second connectors being electrically and mechanically releasably attached to respective ones of said at least one receiving connector of respective ones of said electrical hubs whereby said data transmission electrical conductors provide a data transmission electrical connection between said electrical hubs.

9. The network according to claim 8 wherein said data transmission electrical conductors form USB wiring and said first and second connectors are USB male connectors.

10. The network according to claim 8 wherein said main body includes a central portion extending in at least said horizontal direction.

11. The network according to claim 8 wherein said main body has an upper leg extending downwardly and attached to said first end, a lower leg extending upwardly and attached to said second end, and a central portion extending in a horizontal direction and being connected between said upper leg and said lower leg.

12. An electrical hub network comprising:

a first electrical hub having a first receiving connector and a second electrical hub having a second receiving connector, said second hub being positioned adjacent to said first hub such that said second receiving connector is spaced vertically and horizontally from said first receiving connector in a common plane;

a rigid housing formed for enclosing a plurality of data transmission electrical conductors, said housing including a main body, a first end and a second end, a spacing between said first and second ends corresponding to the spacing between said first and second receiving connectors;

at least a first connector and a second connector, said first and second connectors being attached to said first and second ends respectively; and at least two data transmission electrical conductors extending through said housing and being electrically connected at opposite ends to said first and second connectors, said first and second connectors being electrically and mechanically releasably attached to said first and second receiving connectors respectively whereby said at least two data transmission electrical conductors provide a data transmission electrical connection between said first and second electrical hubs.

13. The network according to claim 12 wherein said main body has an upper leg attached to said first end, a lower leg attached to said second end, and a central portion extending in a horizontal direction and being connected between said upper leg and said lower leg, said upper leg and said lower leg extending in opposite parallel spaced apart directions.

* * * * *